United States Patent Office 3,583,962
Patented June 8, 1971

3,583,962
NITRATED POLYMERS CROSSLINKED WITH DIACYL HALIDES OR ALKALI METAL HYDROXIDES
Daniel Magay, Palo Alto, Calif., assignor to Raychem Corporation, Menlo Park, Calif.
No Drawing. Filed Aug. 30, 1968, Ser. No. 756,432
Int. Cl. C08f 27/08, 27/00
U.S. Cl. 260—89.1
22 Claims

ABSTRACT OF THE DISCLOSURE

Nitrated polymers formed by treatment of the polymers with nitrogen dioxide are crosslinked in the solid state by reaction with various reagents. These reagents include: diacyl halides and bases such as alkali metal hydroxides.

BACKGROUND OF THE INVENTION

It is well known that the usefulness of polymers and particularly shaped articles can be greatly extended by crosslinking. Crosslinking can be accomplished by treatments such as ionizing radiation or ultraviolet light in the presence of a photo-active agent or by the use of chemical agents such as peroxides. The crosslinking of polymers and shaped articles thereof brings about substantial improvement in the properties, including increased tensile strength, substantially reduced solubility, increased stress crack resistance, improved thermal dimensional stability and the ability to exhibit elastic memory.

Theer are several well known methods according to which recoverable materials may be formed such that they possess the property of plastic or elastic memory. One such method is clearly disclosed in U.S. Pat. No. 2,027,962 which is incorporated herein by reference. As disclosed in that patent, such materials are independently dimensionally heat unstable, i.e., capable of changing dimension to assume the heat stable condition upon the application of heat alone. In general, the heat recoverable material can be formed by crosslinking a polymer in a given configuration, applying heat and deforming the polymer to a new form and then cooling the polymer in this new form. Upon the subsequent application of heat, the article will tend to return to the original form in which it was crosslinked.

In the fabrication of heat recoverable articles and other types of crosslinked materials, there is considerable advantage to be obtained by crosslinking in the solid state. Here crosslinking occurs after fabrication and the internal forces holding the polymer molecules together are strong enough to keep the shaped object from distortion. The temperature at which crosslinking takes place should, of course, be below that at which distortion of the article will occur. Two commonly used methods of solid state crosslinking are treatment with ionizing radiation and ultraviolet light.

The crosslinking of polyolefins such as polyethylene and ethylene copolymers by ionizing radiation suffers from certain disadvantages. In general, it is an expensive process and more importantly only shaped articles with some degree of geometric regularity, i.e., tubing and wire insulation, are readily crosslinked when the source of radiation is charged particles such as electrons. With gamma radiation, this objection is not so severely felt, but the rates are very slow with hours generally required for substantial useful crosslinking.

With ultraviolet light, in order to obtain effective or useful crosslinking, the object to be crosslinked must be reasonably transparent to ultraviolet light, precluding the use of reinforcing fillers such as carbon black, flame retardant additives, i.e., antimony oxide, etc. Further, such a reasonably ultraviolet transparent object may subsequently exhibit poor weathering or aging when exposed to outdoors.

Chemical crosslinking of polymers in the molten state avoids some of these problems of irradiation and can be accomplished by adding organic compounds such as peroxides, azides, etc., to the polymer. However, chemical crosslinking normally must be carried out in the molten state rather than the solid state. Molten state chemial crosslinking is necessitated by the fact that the temperatures at which the crosslinking agent is incorporated into the polymer and at which crosslinking takes place are both usually higher than the melting point of the uncrosslinked polymer. Of course, fabrication into a shaped article must occur in the uncrosslinked state. Thus, chemical crosslinking usually must be carried out in the molten state, within the confines of some sort of mold or constraint used to form the shaped article.

SUMMARY OF THE INVENTION

It is accordingly an object of the present invention to provide a novel process for the forming of a novel chemically crosslinked polymer.

A further important object is to provide a method of chemically crosslinking a polymer in the solid state, i.e., at relatively low temperatures.

It is further an object of this invention to provide a novel crosslinked polymer. Other objects will be apparent from a more detailed description as follows.

Briefly, the present invention comprehends the crosslinking of polymers by first reacting them with a nitrating agent, such as nitrogen dioxide. The principal manifestation of this treatment is the introduction of nitro groups into the polymer chain. The so-treated polymer can then be shaped or fabricated, and then, at a temperature at which the polymer does not flow or distort, the article can be contacted with various chemical reagents found to induce crosslinking.

DESCRIPTION OF PREFERRED EMBODIMENTS

This invention is applicable in general to polymers derived from mono-ethylenically unsaturated monomers. The polymer should contain repeating —$CH_2$— units capable of being nitrated as in polyolefins. Polymers that may be used in the present invention include polyethylene, polybutene-1, polyvinyl acetate, polyethyl acrylate, poly-(cetyl acrylate), copolymers thereof, etc. Thus, it is believed that any polymer capable of having active sites introduced by nitration, either in the backbone or the side chain, may be used and that the polymer may also contain nondeleterious substituents such as benzene groups, ester groups, ether groups, etc.

A suitable method for introducing reactive sites to the polymer is by treating the polymer with nitrogen dioxide ($NO_2$), or fuming nitric acid containing about 20% $NO_2$. It is convenient to carry out the reaction with the polymer in the form of a powder or small granules which are exposed directly to the gaseous nitrogen dioxide. Although a wide range of temperatures can be used for this reaction, it has been found that for polyethylene the reaction is slower at room temperature and a temperature above 60° C. is a preferred reaction temperature. The reaction conditions will, of course, vary with the polymer being treated. The extent of the reaction, namely, the number of nitro groups per gram of polymer can be controlled by regulating the temperature and the time of nitration, and the amount of reagent such as nitrogen dioxide. It is desirable to exclude all traces of oxygen in the initial reaction conditions.

In nitrating powdered polyolefin, it is normally possible to obtain some sort of gross uniform distribution of reactive sites within the polymer. The distribution of nitro groups within a given polymer chain is expected to be somewhat random, but generally all chains contain a number of nitro groups relative to the number of hydrocarbon units in the chain. Such a distribution of nitro groups from one chain to another may be desirable because it is thought that the reactive sites are related to the number of nitro groups and that a crosslink takes place where nitration has occurred. Thus, a uniform distribution of crosslinks can be obtained. However, the uniformity of reactive sites from one polymer chain to another is somewhat dependent upon the rate of diffusion of nitrogen dioxide in the polymer. Thus, when larger particles, or pellets, of polymer are being nitrated, there may be a tendency to form a higher concentration of nitro groups or reactive sites near the outer surface of the particle. It has been found that this uneven formation of reactive sites is not a great disadvantage since the nitrated pellets are coalesced together in the molten state during the act of incorporating additives and/or fabrication and, as a result of mixing at that temperature, a uniform distribution of nitro groups is obtained. It is necessary to have two or more nitro groups per polymer chain if that chain is to participate in the crosslinking.

Although the above-described method of introducing reactive sites by nitrating the base polymer has been found to be particularly effective in carrying out the present invention, the invention is by no means limited to this process of obtaining nitrated polymers and other processes may be employed to form nitrated polymers for use in this invention without departing from the scope of the invention.

The reactive sites are believed to be centered around the hydrogen attached to the carbon atom which also contains the nitro group. This hydrogen is known to be reactive to certain reagents.

The shaped article, prepared from the nitrated polymer, is contacted to the vapors of the reagent. A catalyst can be present. Alternately, the shaped article can be contacted with the pure liquid reagent, or a solution thereof. Gaseous reagents include diacid halides such as oxalyl chloride, succinyl chloride, glutaroyl chloride, etc. Preferred liquid reagents include a solution of terephthaloyl dichloride, sebacoyl chloride, etc.

Alternatively, the shaped object may be contacted with a strong base such as a solution of sodium or potassium hydroxide in methanol or ethanol.

With the use of acid chloride, hydrogen chloride is evolved during the crosslinking process, the presumption being that the polymer is crosslinked by the formation of linkages of the following structure:

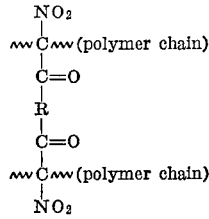

where the crosslinking reagent was the diacid chloride:

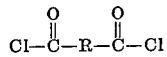

where R is a divalent organic radical, or a valence bond.

Crosslinking can be effected by strong bases. Here, the crosslinking reaction and structure are not well understood, but are believed to be a result of condensation reactions.

The crosslinked polymers of the present invention display good elastic memory. Thus, if a shaped article which has been crosslinked according to the present invention is heated and distorted to a new shape and cooled below the crystalline melting point in this distorted form, it will return to its original shape upon the application of heat. The crosslinked polymers of this invention also show exceptional stability to heat and aging.

Crosslink levels were measured in two ways. The elastic modulus was measured for these crosslinked systems in the molten state where the modulus of elasticity is proportional to the crosslink level, and where the absence of crosslinks shows essentially a zero modulus of elasticity. A second technique is the treatment of the crosslinked polymer system with a solvent at a temperature at which the uncrosslinked polymer completely dissolves in the solvent. The percent of insolubles is called the percent gel and reflects crosslinking levels.

Certain additives, such as fillers and antioxidants, can be incorporated into the nitrated polymer without adverse effects on the crosslinking reaction, as well as they themselves remaining functional after crosslinking. Exactly what additives can be used will be a function of the crosslinking reagent used and the additive used. This can be discovered empirically by anyone skilled in the prior art.

The invention is further illustrated by the following examples in which all parts are by weight unless otherwise indicated.

EXAMPLE 1

Polyethylene powder was nitrated as follows. A powdered polyethylene having a melt index of 1 and density of 0.916 was placed in a two-liter kettle. The vessel was immersed in a hot oil bath and nitrogen gas was passed through the vessel for 30 minutes to remove oxygen. Subsequently, nitrogen dioxide was introduced and passed over and through the powdered polyethylene. At the end of the nitrogen dioxide treatment, nitrogen was reintroduced into the kettle and passed through and over the sample for 30 minutes to remove unreacted nitrogen dioxide and gaseous reaction products. Final traces of gaseous products were removed in a vacuum oven. The color of the product was dark yellow, possibly due to an antioxidant in the polyethylene.

The nitrated polyethylene was analyzed for the number of methylenes per nitro group by infrared measurements. A calibration curve was obtained by plotting the concentration of 2-nitropropane in cyclohexane against the $-NO_2$ absorbence at 1555 cm.$^{-1}$. Beer's law was obeyed. The concentration of $-NO_2$ groups in the nitropolyethylene was determined assuming no change in the nitro group extinction coefficient. To insure that there is no such variation in the intensity of the $-NO_2$ absorption if in a primary position, a calibration curve of 1-nitropropane was also obtained. It coincided with the curve of the 2-nitropropane within experimental error.

Table I below indicates the degree of nitration for various reaction times.

TABLE I

| Number | Temp. (° C.) | Reaction time (min.) | mM. of $-NO_2$ group/g. of polymer |
|---|---|---|---|
| 1 | 100 | 25 | 0.083 |
| 2 | 100 | 60 | 0.125 |
| 3 | 100 | 90 | 0.170 |
| 4 | 100 | 120 | 0.275 |
| 5 | 100 | 360 | 0.928 |

The effect of temperature on the degree of nitration was determined using the above outline procedure with a Parr 4500 stainless steel reactor and vacuum in place of the nitrogen purge. The results are summarized below in Table II.

TABLE II

| Number | Temp. (° C.) | Reaction time (hrs.) | mM. of $-NO_2$ group/g. of polymer |
|---|---|---|---|
| 1 | Room temp. | 19 | No detectable reaction. |
| 2 | 80 | 2 | 0.170. |
| 3 | 60 | 21 | 0.230. |
| 4 | 60–80 | 20 | 0.265. |
| 5 | 65–80 | 22 | 0.348. |
| 6 | 60–80 | 21 | 0.447. |

EXAMPLE 2

Using the procedure of Example 1, pellets of a polyethylene-vinyl acetate copolymer were nitrated using nitrogen dioxide at around 60° C. for 15 hours. The pellets were oblate spheroidal in shape, of approximately 3 mm. for a major axis and 2 mm. for a minor axis. The degree of nitration was found to be 0.233 mmoles (mM.) of —$NO_2$ groups per gram of polymer by infrared spectrophotometric absorption.

EXAMPLE 3

Forty pounds of polyethylene pellets (density 0.918, melt index 2), approximately the same size and shape as the copolymer nitrated in Example 2 above, were placed in a 20-gal. glass-lined kettle and agitated by means of an anchor-shaped stirrer. The pellets were heated to 85° C. and exposed to nitrogen dioxide for about 16 hours. The nitrated polymer obtained was nearly white, and the infrared spectrophotometric analysis showed 0.130 mM. of nitro groups per gram of polymer.

EXAMPLE 4

The level of nitro groups is conveniently controlled by the amount of nitrogen dioxide exposed to the polymer. In a series of experiments, pellets of polyethylene (density 0.94, melt index 2) were reacted in $NO_2$ in a three-necked, 300 ml. round-bottom flask at 90° C. for 18½ hours. The results are shown in Table III below.

TABLE III

| Number | Weight of polyethylene (g.) | Weight of $NO_2$ (g.) | mM. of —$NO_2$ group/g. of polymer |
|---|---|---|---|
| 1 | 500 | 1.68 | 0.051 |
| 2 | 250 | 1.68 | 0.095 |
| 3 | 125 | 1.01 | 0.121 |

In the following examples, the crosslinking levels of the nitrated polymers were determined by measuring the modulus of elasticity at 150° C. (Young's modulus), or by ascertaining the level of insoluble material in refluxing xylene (approximately 140° C.). This latter value is expressed as the percent gel, or the percent insolubles. Young's modulus above the crystalline melting point of polymers is generally proportional to crosslinking levels. While percent gel levels are not proportional to crosslinking, they bear a direct relationship to crosslink level, i.e., high gels reflect high crosslinking levels; low gels, low crosslinking levels.

EXAMPLE 5

This example illustrates the crosslinking of nitropolyethylene with oxalyl chloride. Nitropolyethylene containing 0.447 mM. of nitro group per gram of polymer (obtained as described in Example 1, Table II, No. 6) was fabricated into .025" thick slabs at 150° C. The slabs were then contacted with vapors from refluxing oxalyl chloride at 64° C. and then placed in a 100° C. oven for various length of time. Crosslink was determined by Young's modulus and percent gel. The results are summarized in the following table.

TABLE IV

| No. | Time in acid chloride (seconds) | Time in oven (hours) | Gel formation (percent) | Young's modulus (p.s.i.) at 150° C. | Ultimate strength (p.s.i.) at 150° C. |
|---|---|---|---|---|---|
| 1 | 0 | 1 | 0 | 0 | 0 |
| 2 | 15 | 1 | 26 | 7 | 34 |
| 3 | 30 | 1 | 40 | 10 | 33 |
| 4 | 60 | 1 | 62 | 26 | 41 |
| 5 | 60 | 19 | 68 | 44 | 110 |
| 6 | 180 | 64 | 79 | 61 | 53 |

EXAMPLE 6

This example illustrates the crosslinking of nitropolyethylene with several difunctional acid chlorides. Nitropolyethylene containing 0.12 mM. of nitro group per gram of polymer (prepared as described in Example 4, Table III, No. 3) was pressed at 150° C. into slabs .025" thick.

Acid chlorides were diffused into the nitropolyethylene slabs at 100° C. in the liquid phase, except for oxalyl chloride which was incorporated in the vapor phase at 64° C. After incorporation of the acid chloride, the .025" thick slabs were hung in a 100° C. oven for 20 hours. The crosslinking results are indicated below.

TABLE V

| No. | Acid chloride | Acid chloride (percent) | Gel formation (percent) | Young's modulus (p.s.i.) at 150° C. | Ultimate strength (p.s.i.) at 150° C. |
|---|---|---|---|---|---|
| 1 | None | | 0 | 0 | 0 |
| 2 | Oxalyl | | 83 | 24 | 59 |
| 3 | Succinyl | 6.4 | 61.5 | 14.4 | 53 |
| 4 | Adipoyl | 6.1 | 60.5 | 9.8 | 30 |
| 5 | Sebacoyl | 9.1 | 86 | 12.1 | 20 |

EXAMPLE 7

This example illustrates the crosslinking of nitropolyethylene in the presence of ethanolic KOH.

A slab .010" thick was pressed at 150° C. of nitropolyethylene containing 0.89 mM. of nitro group per gram of polymer. Twenty grams of KOH were dissolved in 250 ml. ethanol. The slab of nitropolyethylene was immersed in the solution and was kept under reflux for 15 hours. The slab was dried in a vacuum oven. Crosslinking was measured by Young's modulus at 150° C. and gel percent.

TABLE VI

| | Young's modulus (p.s.i.) at 150° C. | Gel formation (percent) |
|---|---|---|
| Before treatment | >5 | 0 |
| After treatment with ethanolic KOH | 129 | 58 |

EXAMPLE 8

An ethylene/vinyl acetate polymer (DQDE 1868) was nitrated to a level of $2 \times 10^{-4}$ mole of $NO_2$ group/g. of polymer. A slab 0.02" thick was pressed out at 150° C., and exposed to oxalyl chloride vapor for 13 days at a temperature varying between 65° C. and 75° C. After treatment, the slab was placed in a vacuum oven to remove the excess reactant. The so-treated slab and a control slab of nitrated polymer which had not been exposed to oxalyl chloride vapor were then heated to 150° C. and the Young's modulus of each measured.

Table VII

| | Young's modulus (p.s.i.) |
|---|---|
| Sample exposed to oxalyl chloride vapor | 98 |
| Control | >5 |

The foregoing examples are merely illustrative of the present invention and should in no way be considered as limiting the scope of the invention. Thus, any polymer which can be nitrated to form active sites may be crosslinked according to this invention. Although the invention is particularly useful in solid state crosslinking, molten state crosslinking may be employed. Furthermore, any desired method of incorporating the crosslinking agent, catalysts and other materials into the polymer may be used. The nitropolyethylene may be converted to a heat recoverable and shaped article by any conventional fabricating technique such as molding, extruding, etc.

I claim:
1. The method of crosslinking a polymer of a monoethylenically unsaturated monomer, said polymer containing repeating —CH$_2$— groups and at least 2

$$-\underset{\underset{NO_2}{|}}{\overset{\overset{H}{|}}{C}}-$$

groups per polymer chain engaging in crosslinking, which comprises introducing into the polymer crosslinking proportions of a crosslinking agent selected from the group consisting of diacyl halides and alkali metal hydroxides, and reacting the said agent and polymer for a time and at a temperature sufficient to achieve crosslinking.

2. The method of claim 1 wherein the selected agent is an alkali metal hydroxide.
3. The method of claim 1 wherein said crosslinking agent is a diacyl halide.
4. The method of claim 1 wherein said crosslinking agent is oxayly chloride.
5. The method of claim 1 wherein said crosslinking agent is succinyl chloride.
6. The method of claim 1 wherein said crosslinking agent is glutaroyl chloride.
7. The method of claim 1 wherein said crosslinking agent is terephthaloyl dichloride.
8. The method of claim 1 wherein said crosslinking agent is sebacoyl chloride.
9. The method of claim 1 wherein the crosslinking agent is in the liquid state when it is introduced into the polymer.
10. The method of claim 1 wherein said crosslinking agent is in the vapor state when it is introduced into the polymer.
11. The method of claim 1 wherein said polymer is a homopolymer of a monomer selected from the group consisting of ethylene, butene-1, acetate, ethyl acrylate, and cetyl acrylate.
12. The method of claim 11 wherein said polymer is polyethylene.
13. The method of claim 11 wherein said polymer is polybutene-1.
14. The method of claim 11 wherein said polymer is polyvinyl acetate.
15. The method of claim 11 wherein said polymer is polyethyl acrylate.
16. The method of claim 11 wherein said polymer is poly(cetyl acrylate).
17. The method of claim 1 wherein said polymer is a copolymer of ethylene and vinyl acetate.
18. The method of crosslinking a polymer of a monoethylenically unsaturated monomer, said polymer containing repeating —CH$_2$— groups, which comprises nitrating the polymer to provide at least 2

$$-\underset{\underset{NO_2}{|}}{\overset{\overset{H}{|}}{C}}-$$

groups per polymer chain engaging in crosslinking, introducing into the nitrated polymer crosslinking proportions of a crosslinking agent selected from the group consisting of diacyl halides and alkali metal hydroxides, and reacting the said agent and nitrated polymer for a time and at a temperature sufficient to achieve crosslinking.

19. The method of claim 18 wherein said crosslinking agent is an alkali metal hydroxide.
20. A crosslinked polymer prepared according to the method of claim 1.
21. A crosslinked polymer prepared according to the method of claim 11.
22. A crosslinked polymer prepared according to the method of claim 17.

References Cited

UNITED STATES PATENTS

| | | | |
|---|---|---|---|
| 2,265,722 | 12/1941 | de Nie | 260—94.7 |
| 2,386,347 | 10/1945 | Roland | 260—80.75 |
| 2,603,665 | 7/1952 | Young | 260—644 |
| 2,997,504 | 8/1961 | Shechter | 260—635 |
| 3,160,514 | 12/1964 | Wheelock | 117—38 |
| 3,254,068 | 5/1966 | Furrow | 260—88.7 |
| 3,272,783 | 9/1966 | Lucke | 260—79.3 |
| 3,285,885 | 11/1966 | Shepherd | 260—79.5 |
| 3,445,437 | 5/1969 | Reich | 260—80 |

FOREIGN PATENTS

| | | | |
|---|---|---|---|
| 1,226,788 | 10/1966 | Germany | 260—47 |

OTHER REFERENCES

Szmant, H. H., Organic Chem., Prentice-Hall, N.J., p. 499 (1957).
Chemical Abstracts, vol. 65, 1966, 7401a (British Pat. 1,031,908).

JOSEPH L. SCHOFER, Primary Examiner
C. A. HENDERSON, Jr., Assistant Examiner

U.S. Cl. X.R.

106—15; 260—80, 80.3, 87.3, 89.5, 93.7, 94.7, 94.9